US006992463B2

(12) United States Patent
Yoshio

(10) Patent No.: US 6,992,463 B2
(45) Date of Patent: Jan. 31, 2006

(54) BATTERY PROTECTION CIRCUIT

(75) Inventor: Katsura Yoshio, Osaka (JP)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/991,201

(22) Filed: Nov. 16, 2004

(65) Prior Publication Data

US 2005/0242779 A1 Nov. 3, 2005

(51) Int. Cl.
H02J 7/00 (2006.01)
(52) U.S. Cl. .................. 320/134; 320/136; 361/90; 361/91.1
(58) Field of Classification Search ............. 320/134, 320/136; 361/89, 91.1, 91.2; 307/112, 113, 307/114
See application file for complete search history.

(56) References Cited

U.S. PATENT DOCUMENTS

| 4,566,052 A | * | 1/1986 | Kammiller | 361/18 |
| 5,534,788 A | * | 7/1996 | Smith et al. | 324/771 |
| 5,695,886 A | * | 12/1997 | Dewan et al. | 429/7 |
| 5,789,900 A | * | 8/1998 | Hasegawa et al. | 320/132 |
| 5,847,912 A | * | 12/1998 | Smith et al. | 361/93.1 |
| 5,896,025 A | * | 4/1999 | Yamaguchi et al. | 320/134 |
| 6,014,030 A | * | 1/2000 | Smith et al. | 324/705 |
| 6,222,346 B1 | * | 4/2001 | Mori | 320/134 |
| 6,340,880 B1 | * | 1/2002 | Higashijima et al. | 320/162 |
| 2001/0013768 A1 | * | 8/2001 | Suzuki et al. | 320/134 |
| 2003/0030413 A1 | * | 2/2003 | Saeki et al. | 320/136 |
| 2003/0146738 A1 | * | 8/2003 | Kawagoe et al. | 320/134 |

* cited by examiner

Primary Examiner—Michael Sherry
Assistant Examiner—Samuel Berhanu
(74) Attorney, Agent, or Firm—William B. Kempler; W. James Brady, III; Frederick J. Telecky, Jr.

(57) ABSTRACT

A protection of battery system having battery cells Cell1~Cell3, FET switches SW1, SW2 that are connected to the high-side path and control on/off state of the path, as well as fuse F1 for cutting said path, primary protection circuits 31~34 that detect abnormalities in charging/discharging of the battery cells and turn the FET switches off, and secondary protecting controller 38 that detect abnormalities in charging/discharging of the battery cells and controls the operation of fuse F1. Secondary protecting controller 38 controls fuse F1 if there is no tendency to a decrease in abnormalities after a prescribed period of time after control of the FET switch.

19 Claims, 9 Drawing Sheets

| ABNORMAL STATE | DETECTION | SIGNAL NAME | PROTECTION FUNCTION |
|---|---|---|---|
| CLK STOP | IC1 | WDF (WATCHDOG FAULT) | SW1=SW2=OFF |
| OVERCHARGE CURRENT | IC1 | OC (OVER CURRENT) | SW1=SW2=OFF |
| OVER-DISCHARGE CURRENT | IC1 | OL (OVER LOAD) | SW1=SW2=OFF |
| CELL OVER-DISCHARGE | IC3 | LV (LOW VOLTAGE) | SW1=SW2=OFF |
| CELL OVERCHARGE 1 | IC3 | OV1 (OVER VOLTAGE 1) | SW1=SW2=OFF |
| CELL OVERCHARGE 2 | IC2 | OV2 (OVER VOLTAGE 2) | F1 BLOW |

*FIG. 2*

| ABNORMAL STATE | DETECTION | SIGNAL NAME | PROTECTION FUNCTION |
|---|---|---|---|
| CLK STOP | IC1 | WDF (WATCHDOG FAULT) | SW1=SW2=OFF |
| CLK STOP 2 | IC1 | WDF2 (WATCHDOG FAULT 2) | F1 BLOW |
| OVERCHARGE CURRENT | IC1 | OC (OVER CURRENT) | SW1=SW2=OFF |
| OVER-DISCHARGE CURRENT | IC1 | OL (OVER LOAD) | SW1=SW2=OFF |
| CELL OVER-DISCHARGE | IC2 | LV (LOW VOLTAGE) | SW1=SW2=OFF |
| CELL OVERCHARGE 1 | IC2 | OV1 (OVER VOLTAGE 1) | SW1=SW2=OFF |
| CELL OVERCHARGE 2 | IC1 | OV2 (OVER VOLTAGE 2) | F1 BLOW |
| CELL OVERCHARGE 3 | IC1 | OV3 (OVER VOLTAGE 3) | SW(CHG)=OFF |
| REG OVER-VOLTAGE | IC1 | OVREG | F1 BLOW |

*FIG. 4*

BATTERY PROTECTION CIRCUIT

FIELD OF THE INVENTION

The present invention pertains to a battery protection circuit having a protection function that cuts off the current path when a charge/discharge abnormality in multiple battery cells occurs.

BACKGROUND OF THE INVENTION

Battery systems containing lithium ion battery cells or other plural battery cells (secondary battery cells) connected in series are used in various pieces of equipment. Since the battery structure is small but has a high output, a charge/discharge abnormality may take place easily. There are various types of charge/discharge abnormalities, such as rising voltage due to over-charging of the cells, falling voltage due to over-discharge, over-charging current flowing from the external path to the battery cells, over-discharge current flowing from the battery cells to the outside, etc. When such an abnormality takes place, it is necessary to detect it appropriately and to protect the battery cells and the external equipment from over-currents and over-voltages.

Recently, the performance of battery systems has been improved by the inclusion of various functions, such as the remaining charge display function, etc. As a result, a battery system that has a microcomputer ($\mu$C) to control plural integrated circuits (IC) has been realized in many schemes. In such cases, it is also necessary to protect the IC that handles the small signals from over-charging or over-discharging.

In consideration of said requirement, the protection function is important. However, if the protection function is too strict, the current path will be cut off frequently due to noise, etc., making it difficult to use. On the other hand, it is necessary to apply several levels of fail-safe features to ensure that there is no fatal damage that may destroy the battery cells and external equipment. Therefore, protection is increased by the inclusion of different protection levels, that is, primary and secondary levels. Also, efforts have been made to use separate ICs for primary protection and for secondary protection, so that different abnormalities in the system, such as in the power source, clock signal, etc., do not influence each other.

However, separating the ICs used for different protection levels is undesirable in consideration of assembly size and cost. Also, when it is determined that the primary protection function is down, a fuse must be blown to initiate the secondary protection function. Such battery system must be reset to be used again, which is undesirable. That is, although separating the ICs in accordance with the protection level has the advantage of increased protection, there is the disadvantage that when it is determined that the primary protection function is down due to a malfunction, etc., the system cannot be reset. Also, this scheme is undesirable in consideration of size and cost.

A problem for the battery system is that when the protection function is increased, the protection function may work unnecessarily, but then cannot be reset. As a result, the operating efficiency is poor.

SUMMARY OF THE INVENTION

One aspect of the present invention provides a battery protection circuit comprising the battery protection circuit is to control the operation of the first switch circuit and the second switch circuit inserted in series in the power supply path between battery cells and an external power source; it comprises a first protecting controller, which has an interface circuit for receiving the command signal output from a controller having the function of monitoring whether the voltage of the battery cells is higher than a first voltage, and which supplies the control signal for controlling the operation of the first switch circuit, and it comprises a second protecting controller, which has an over-voltage detector that detects whether the voltage of the battery cells is higher than a second voltage or higher than said first voltage, and which supplies the control signal for controlling the operation of the first switch circuit and the control signal for controlling off of said second switch circuit; wherein, when said over-voltage detector of said second protecting controller detects that the voltage of the battery cells is higher than said second voltage, a control signal for turning off said first switch circuit is supplied; then, when the voltage of the battery cells is still higher than said second voltage after a prescribed time, a control signal is supplied for turning off the second switch circuit.

A preferred embodiment has the first protecting controller and said second protecting controller of the battery protection circuit of the present invention being formed on the same semiconductor chip (IC).

According to an aspect of the present invention, it is preferred that the battery protection circuit have a first power source circuit that generates the power source voltage for said first protecting controller from the voltage supplied from the battery cells or the voltage supplied from the external power source, and a second power source circuit that generates the power source voltage for said second protecting controller from the voltage supplied from the battery cells.

According to an aspect of the present invention, it is preferred that the battery protection circuit have a comparator that compares the output voltage of said first power source circuit and a reference voltage, and when said comparator detects that the output voltage of said first power source circuit is higher than said reference voltage, a control signal is output for turning off the second switch circuit.

According to an aspect of the present invention, it is preferred that the battery protection circuit have a clock monitoring circuit that monitors the clock signal supplied from the controller, and a register for holding the first or second mode state, with the following function: when the clock signal is not supplied throughout a first period, a reset signal is supplied to the controller, and at the same time, a control signal for turning off the first switch circuit is output; then, if the clock signal is not supplied throughout a second period, in the first mode, said reset signal is supplied, and in the second mode, a control signal for turning off the second switch circuit is output.

According to an aspect of the present invention, it is preferred that the battery protection circuit have a cell balance circuit that balances the battery cell voltage by means of short-circuit control between electrodes of the battery cells, and a control signal gate circuit that prohibits outputting the control signal to the first switch circuit during the period when said cell balance circuit performs cell balance.

According to an aspect of the invention, before the second protecting controller of the battery protection circuit with the aforementioned constitution controls the operation of the second switch circuit, which has a higher protection level by cutting off the power supply path connected to the battery cells, the system attempts to control the first switch circuit that switches the power supply path on and off and controls the reset function. That is, only when no decrease in the tendency toward abnormal charging/discharging of the battery cells being monitored is observed after a prescribed period of time is a control signal supplied for controlling the operation of the second switch circuit. Also, if the first switch circuit is made up of NMOS transistors and an abnormality takes place in the switch circuit or the bias circuit, the gate may become unbiased. Even in this case, the first switch circuit is still maintained in the off state. The comparator monitors the output of the first power source circuit that supplies the power source voltage to the controller (microcomputer). If an abnormality is detected by the comparator, it outputs a signal for turning off the second switch circuit in response to said abnormality. Consequently, when there is an abnormality in the voltage fed to the controller, a high voltage may be applied to the controller and the internal data may be damaged. In this scheme, since the power supply path has been cut off by the second switch circuit beforehand, the voltage source to the controller itself is cut off. If there is a clock monitoring circuit and it detects an abnormality in the clock signal, it outputs a control signal to turn off the first switch circuit and a reset signal to the controller. Then, if another abnormality in the clock signal is detected, in the first mode, a reset signal is output, and, in the second mode, the second switch circuit is turned off. In this way, by setting the first mode or second mode in the register, it is possible to generate an appropriate protection operation sequence. If there is a cell balance function, since the cell balance circuit works in the cell balance state, by means of the short-circuit control between the electrodes of the battery cells, the cell voltage is balanced among the plural cells. During such control, detection of a charge/discharge abnormality in the battery cells to be protected may not be an actual charge/discharge abnormality, although it is determined to be one. However, by setting a control signal gate circuit that prohibits output of the control signal to the first switch circuit, the internal circuit is not cut off when no control signal is output.

BRIEF DESCRIPTION OF THE DRAWINGS

FIG. 2 is a table listing the protection modes of the battery system shown in FIG. 1.

FIG. 4 is a table listing the protection modes of the battery system shown in FIG. 3.

EXPLANATION OF THE REFERENCE SYMBOLS

In the FIGS. 1A, 1B represents a battery system; 2 represents a microcomputer (IC3); 3A represents a primary protection circuit; 3B represents a protection circuit; 4 represents a secondary protection circuit; 31 represents a FET drive circuit; 32 represents a over-current detector; 33 represents a cell amplifier; 34 represents a cell selection switch; 35 represents a regulator; 36 represents a watchdog circuit; 37 represents an interface logic circuit; 38 represents an over-voltage detector; 39 represents a fuse blow output circuit; 41 represents a comparator for OVREG monitoring; 42 represents a level shift circuit; 43 represents a switch; 44 represents an AND gate; 45 represents a control logic circuit.

DESCRIPTION OF THE EMBODIMENT

For the battery protection circuit of the present invention, when secondary protection is performed, because the primary protection has been performed before it, the number of cycles of execution of the secondary protection that cannot be reset can be minimized, so that the operating efficiency can be improved. Also, the interlocked protection operation can be completed by the secondary protection control part (second protecting controller), it is easy to design the operation timing, etc. In addition, the primary protection side and the secondary protection side can work independently, and the primary protection performed from the secondary protection side is separated from the protection performed independently in the primary protection control part (the first protecting controller). Consequently, there is no decrease in the level of protection. On the contrary, it is increased. Also, with system abnormalities also taken into consideration, there is no mutual influence between the primary protection side and the secondary protection side.

Also, according to the present invention, it is possible to realize the fail-safe function that the current path can be cut off automatically by the design of the first switch circuit itself, as well as the fail-safe function that guards against data damage in the microcomputer or other controller.

In addition, there is freedom in setting the protection level abnormal clock signals, and it is possible to optimize it to increase the protection.

In addition, no faulty protection can take place in the cell balance mode, which improves operating efficiency.

Figure 1:
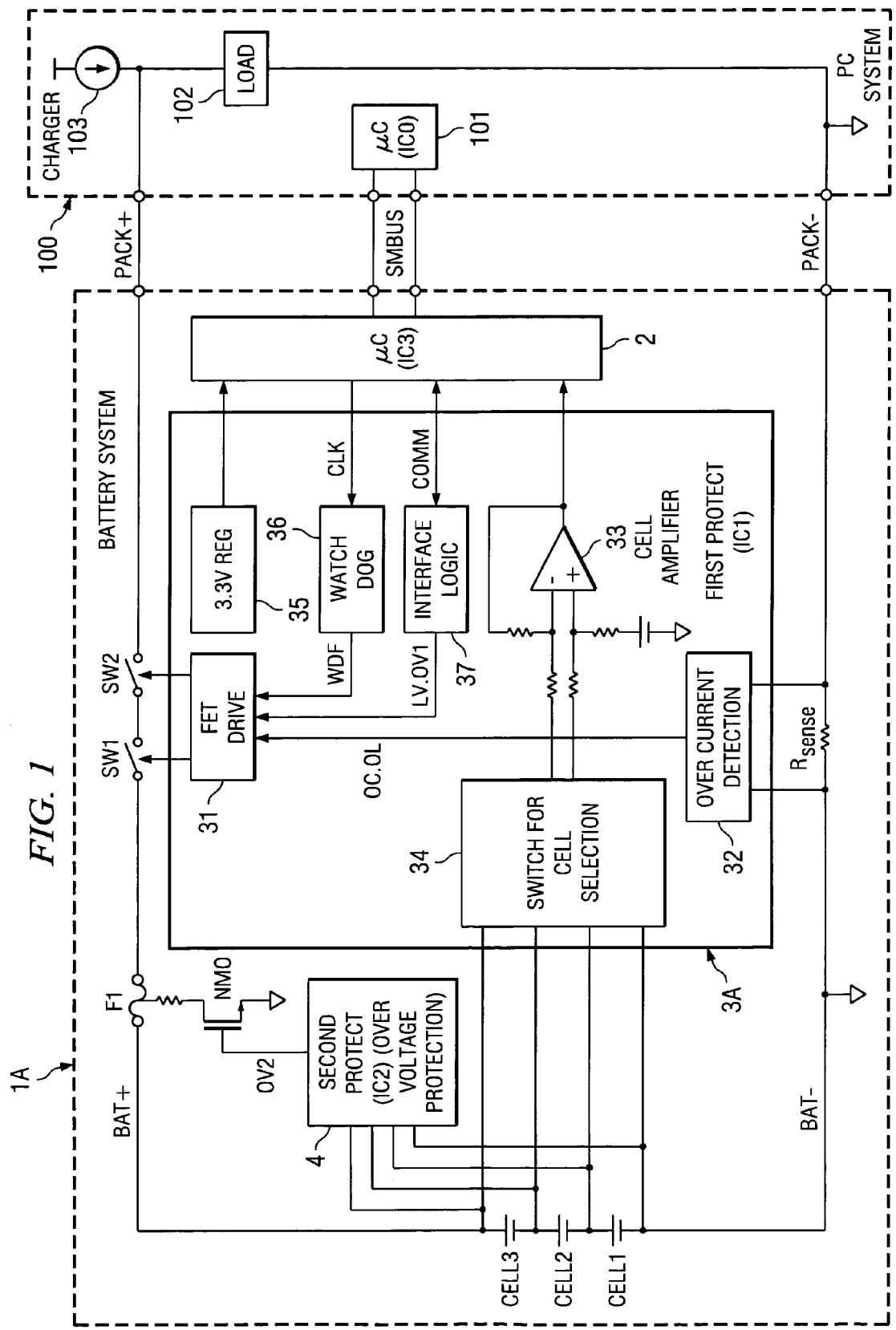
FIG. 1 is a diagram illustrating the constitution of the battery system in an embodiment of the present invention.

FIG. 1 is a diagram illustrating the constitution of a battery system.

This figure illustrates a secondary battery system that contains lithium ion batteries, etc. which is as battery system 1A installed in personal computer (PC) system 100. Said battery system 1A contains several (e.g., 3) battery cells Cell1, Cell 2 and Cell3 connected in series.

Battery system 1A contains a protective circuit for preventing over-voltage or over-current of said battery cells. Also, PC (personal computer) system 100 contains a circuit for transmission of the battery remaining charge. In the constitution shown in FIG. 1, battery system 1A contains three integrated circuits ICs. One is microcomputer 2 (IC3), a controller that has the function of detecting the remaining charge and of communicating with other controller (μC: IC0) 101 of PC system 100 via SMBUS or the like.

Then, there is primary protection circuit 3A (IC1) that has the function of converting the battery voltage and transmitting it to microcomputer 2 (IC3), as well as regulator, over-current protection, and various other functions integrated in it.

Finally, there is secondary protection circuit (IC2) 4 that can detect overcharging of the battery cells and blow fuse F1 in the current path of the battery.

As shown in FIG. 1, the cell-side terminal of the current path on the positive electrode side (high-side path) of the battery cells is represented as "BAT+", and the terminal on the positive electrode side of the PC is represented as "PACK+". Similarly, the cell-side terminal of the current path on the negative electrode side (low-side path) of the secondary battery cells is represented as "BAT−", and the terminal on the negative electrode side of the PC side is represented as "PACK−". For example, in the high-side path, FET switches SW1 and SW2 for primary protection are set. Also, fuse F1 for secondary protection is set. On the other hand, in the low-side path, sense resistor Rsense for detecting over-voltage or over-current is set.

Primary protection circuit (IC1) 3A contains FET drive circuit 31 for driving said FET switches SW1 and SW2, over-current detector 32 connected to the two terminals of said sense resistor Rsense, sense amplifier 33 for detecting the voltages between the various terminals of battery cells Cell1~Cell3, cell selection switch 34 for selecting the battery cell terminals to be connected to the differential input of the cell amplifier, regulator 35 corresponding to the 3.3 V output, watchdog circuit 36 for monitoring the clock signal from microcomputer IC3 2, and interface logic circuit 37 to which the command (Comm.) from microcomputer IC3 is input and which sends a control signal to FET drive circuit 31.

Also, secondary protection circuit 4 is a circuit that monitors the over-voltage between the battery cell terminals for over-voltage protection, and blows fuse F1 by turning on drive transistor NMO of fuse F1 when an over-voltage occurs.

At the level known as the primary protection performed by primary protection circuit IC1, when an over-voltage or over-current, etc. of battery cells Cell1~Cell3 is detected, the protection function works to turn off FET switches SW1 and/or SW2 on the high-side path so as to cut it off. Because an FET switch is an electronic switch, when the abnormal condition disappears, it is reset, and battery system 1A can again supply current to PC system 100.

On the other hand, if said primary protection function fails for some reason, such as a problem with the FET switch or the IC, the secondary protection circuit IC2 4 is used. In secondary protection circuit 4, when overcharging of the battery cells, which is believed to be most dangerous to lithium ion batteries, is detected, NMOS transistor NMO is driven, and fuse F1 on the high-side path is blown. Once the fuse blows, there is no way to reset the current path of battery system 1A and PC system 100.

FIG. 2 is a diagram illustrating the protection mode of said battery system 1A. There are 6 protection modes in battery system 1A.

One is the OV1 protection mode, which provides primary level protection against overcharging (OV: Over Voltage) of the battery cells, the most dangerous scenario. Also, there is the LV protection mode, which provides primary level protection against the over-discharge (represented as "LV: Low Voltage") when the battery cell voltage falls drastically due to short-circuits between internal nodes, etc.

Although not shown in the figure, microcomputer 2 contains an A/D converter (ADC) and an OV (Over Voltage)/LV (Low Voltage) detector.

The voltages between the various battery cell terminals are sequentially switched by cell selection switch 34, and are input to cell amplifier 33. There the signals are converted to a level that can be read by the ADC and are input to microcomputer 2. From the value read from the ADC, microcomputer 2 detects over-charge 1 OV1 and over-discharge LV of each of battery cells Cell1~Cell3. Corresponding to the value detected, microcomputer 2 sends a command (Comm.) to interface logic circuit 37 of primary protection circuit IC1 3A to turn off FET switches SW1 and/or SW2 of the high-side path. This command is sent to FET drive circuit 31 by means of signal OV1 or signal LV, and under its control, FET switches SW1 and SW2 are turned off.

In the aforementioned case, over-charging or over-discharging occurs for reasons on the battery cell side. However, high current or voltage may also take place in the path inside the battery due to factors on the external connecting equipment side (PC system 100). Load 102 inside PC system 100 is connected to external terminals "PACK+" and "PACK−" shown in FIG. 1, and internal power source 103 is connected in the path. Said load 102 may be short circuited, or an over-current due to an abnormality of power source 103 may flow through "PACK+" and "PACK−" into battery system 1A.

The over-currents that take place for such reasons include the over-current flowing on the battery cell side, and the over-current flowing on the PC system side. In the following, the over-current flowing on the battery cell side will be represented as OC (Over Current), and the over-current flowing on the PC system side will be represented as OL (Over Load).

FIG. 2 includes the OC protection mode in which protection from the over-charge current is performed on the primary protection level, and the OL protection mode in which protection from the over-discharge current is performed on the primary protection level.

Over-current detector 32 set in primary protection circuit IC1 3A detects the current passing through sense resistor Rsense. If the current is over a preset level, signals OC, OL are output to turn off FET switches SW1 and/or SW2. Under control of FET drive circuit 31 corresponding to signals OC, OL, said FET switches SW1, SW2 are turned off.

In addition, there is another protection mode (WDF (watchdog fault) protection mode) in which the CLK signal is monitored for detecting an abnormality in microcomputer 2 by means of watchdog circuit 36 assembled in primary protection circuit IC1, and by stopping the CLK signal, said FET switches SW1 and SW2 are turned off.

If the circuit for realizing said protection modes fails for some reason, secondary protection circuit IC2 4 provides backup protection. In this case, there is an OV2 protection mode in which protection from over-charging of the battery cells is performed on the secondary protection level. Secondary protection circuit 4 monitors the voltages between various terminals of battery cells Cell1~Cell3, and after a prescribed time (usually 1~2 sec) with said voltage over a prescribed level, it drives the gate of NMOS transistor NMO to cut off 3-terminal fuse F1. After the fuse is blown, the path between battery cells of battery system 1A and PC system 2 is completely cut off, and it cannot be reset.

Figure 3:
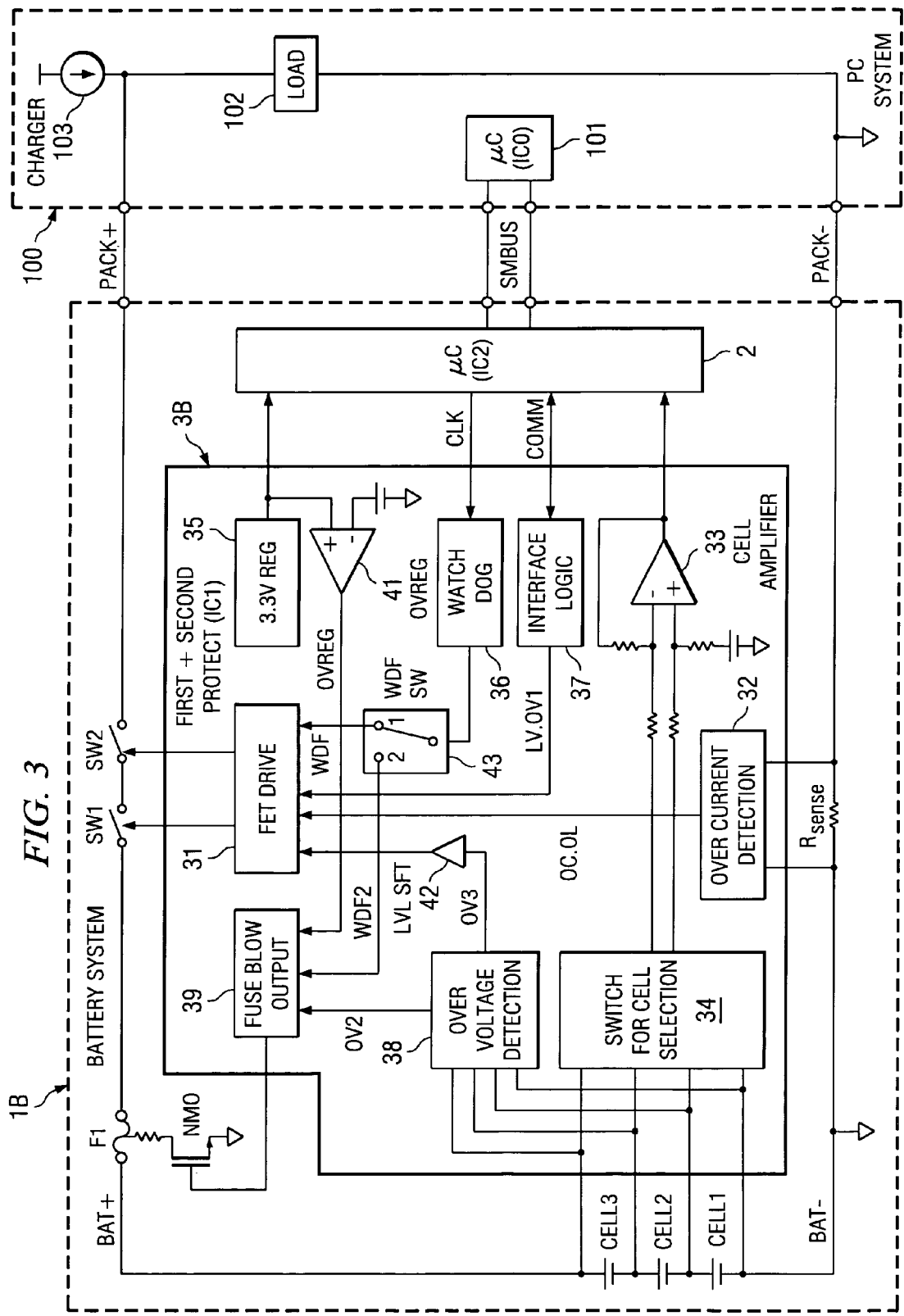
FIG. 3 is a diagram illustrating the constitution with improvement in the battery protection circuit shown in FIG. 1.

FIG. 3 is a diagram illustrating the constitution of the improvement of the battery protection circuit shown in FIG. 1. FIG. 4 is a diagram illustrating the protection modes of the circuit shown in FIG. 3. Since the same part numbers as those in FIG. 1 are used, the explanation of the same constitution and operation will not be repeated.

As shown in FIG. 4, new protection modes are added for adding the fail-safe function. They include the following three newly added protection modes: "WDF (Watchdog Fault)2 protection mode" corresponding to the abnormality state of "CLK stop 2", "OV (Over Voltage) 3 protection mode" corresponding to the abnormality state of "cell overcharge 3", and "OVREG (Over Voltage of Regulator)" corresponding to the abnormality state of "regulator (REG) over voltage". Of these, "OV2 protection mode" is a secondary protection mode shared with that shown in FIG. 1. The others are primary protection modes shared with those shown in FIG. 1. Details of these added protection modes will be explained below.

Battery system 1B shown in FIG. 3 also contains protection circuit 3B that integrates primary protection circuit 3A and secondary protection circuit 4 shown in FIG. 1, and adds more functions. This protection circuit 3B is formed on the same semiconductor chip IC.

As a newly unified constitution of the secondary protection, protection circuit 3B has over-voltage detector 38 and fuse blow output circuit 39. Also, as newly added constitution, it has comparator 41 for OVERG monitoring, level shift circuit (LVL SFT) 42 that shifts the level of the signal output from over-voltage detector 38 in the OV3 protection mode, and switch (WDF SW) 43 for selecting fuse blowing or FET switch off. This switch 43 can be preset corresponding to an operation from the outside, or switched in a prescribed sequence to be explained below. The switching information of switch 43, for example, is stored in the status register in interface logic circuit 37.

Although the constitution of the relationship with the power source is not specifically shown in the figure, the circuit for primary protection and the circuit for secondary protection are driven independently as separate power sources in protection circuit IC 3B. As a result, problems on the primary protection side do not affect the secondary protection side. More specifically, the power source circuit that supplies the power source voltage to over-voltage detector 38 and fuse blow output circuit 39 receives voltage from the BAT terminal, and generates a power source voltage. For the other circuits, the constitution may be such that the power source voltage is supplied from regulator 35. In this case, regulator 35 receives the voltage supplied from BAT terminal or PACK terminal, and generates a power source voltage. Also, one may set a power source circuit supplying power source voltage to the circuit on the primary protection side in addition to regulator 35.

FIGS. 7(A)–7(F) are timing charts of the voltages and signals in the OV3 protection operation. Also, as a control, FIGS. 5(A)–5(F) illustrate the OV1 protection operation, and FIGS. 6(A)–6(F) illustrate the OV2 protection operation.

Figure 5:
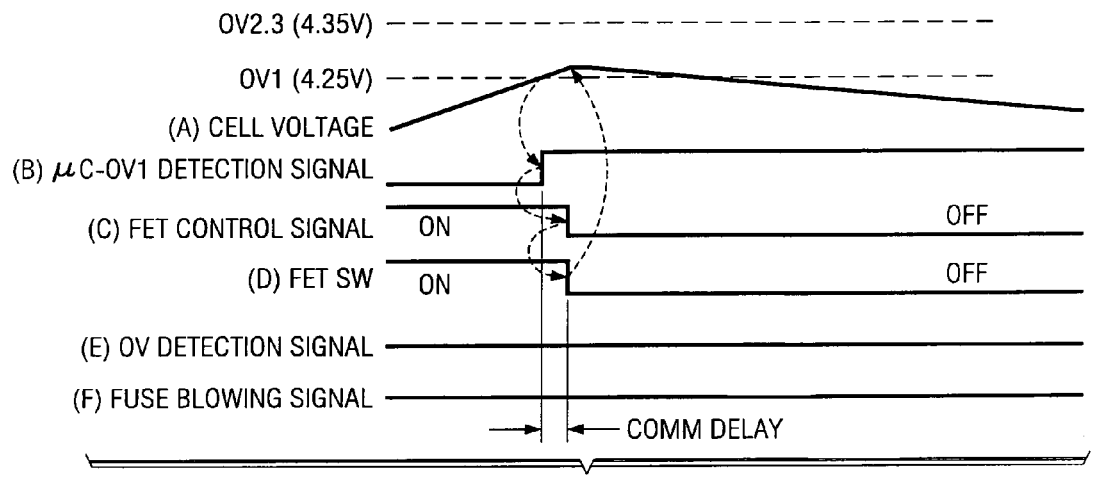
FIG. 5 is a timing chart illustrating the voltages and signals in the OV1 protection operation.

In OV1 protection mode, when the voltage (cell voltage) between certain battery cell terminals rises as shown in FIG. 5(A) and exceeds a prescribed OV1 level (such as 4.25 V), the over-voltage is detected by microcomputer 2, and a command (Comm.) is output to protection circuit 3B so that the FET switch is off. This command is called "µC-OV1 detection signal," and it rises to the high level as shown in FIG. 5(B). At this time, the OV1 signal is sent through switch 43 to FET drive circuit 31. Then, the FET control signal on the low level and indicating off is output (FIG. 5(C)). The falling edge timing of this FET control signal is delayed for a common delay time from the time when the command is issued. Then, the NMOS type FET switches SW1 and/or SW2 are off (FIG. 5(D)). As a result, the high-side path is cut, and the cell voltage gradually falls.

Figure 6:
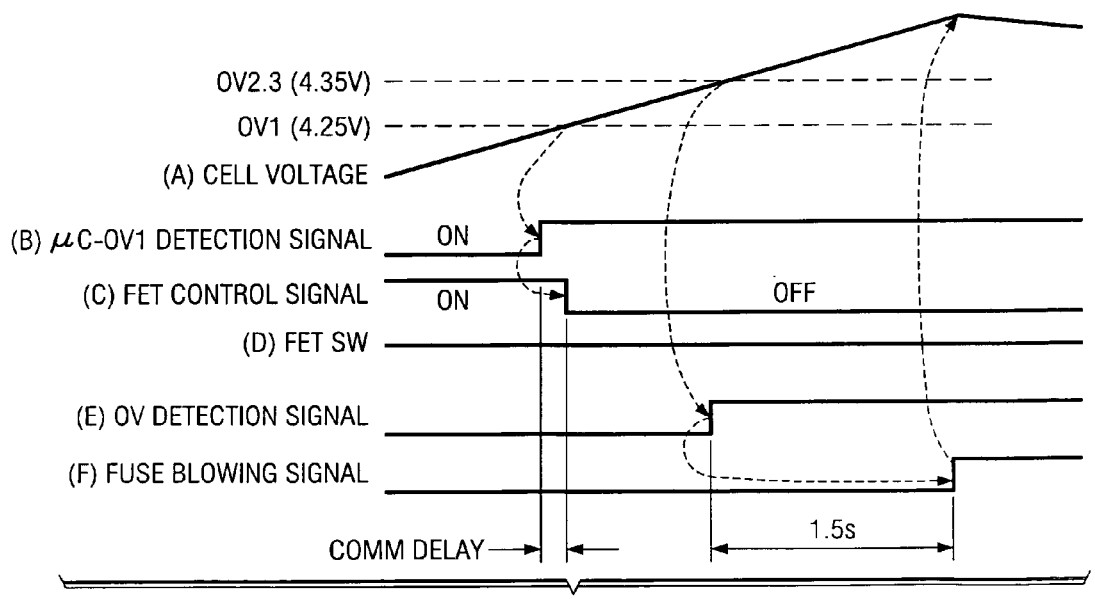
FIG. 6 is a timing chart illustrating the voltages and signals in the OV2 protection operation.

The OV2 protection mode shown in FIG. 6 works when, e.g., a primary protection command is normally issued but the FET switch side does not function normally. For example, this refers to the case when the command of OV1 protection mode generated in the case of over-voltage does not work due to a malfunction in FET drive circuit 31, FET switches SW1, SW2, etc. According to the OV2 protection mode, if the FET switch is not off after a prescribed period of time in such cases, a fuse is blown so as to cut the path (secondary protection). More specifically, as shown in FIG. 6(D), even after a common delay time, the FET switch is still on, and the supply of voltage continues, so that the cell voltage continues to rises to reach OV2 level (e.g., 4.35 V) as shown in FIG. 6(A). In this case, this rise in voltage is detected by over-voltage detector 38 (FIG. 6(E)), and after a preset time (in this example, after 1.5 sec), if the cell voltage is still higher than OV2 level, a signal for blowing the fuse is output (FIG. 6(F)). As a result, the high-side path is cut, and the cell voltage gradually falls. However, because the fuse has been blown, resetting to the original state is impossible.

Also, when the OV detection signal shown in FIG. 6(E) is output, as with the OV3 protection mode to be explained below, a control signal for turning off the FET switch can be output.

As explained above, for the OV2 protection mode, if the problem is due to a malfunction of the FET switches, etc., there is no other choice but to blow the fuse. However, in the constitution shown in FIG. 1, when the command is not recognized due to temporary modulation caused by noise, etc., the fuse is also blown. In such cases, the protection is excessive, and the operating efficiency is poor. To solve this problem, the constitution shown in FIG. 3 contains a new OV3 protection mode.

The OV3 protection mode is a type of the over-charge protection mode for preventing over-voltages in the cell. This novel protection mode has been added to guarantee normal operation of the secondary protection by blowing a fuse. As an example of the case when this protection mode is required, although the FET switch is normal, the command for the primary protection is not sent from the microcomputer, etc. In this case, in the example constitution shown in FIG. 1, although the FET switch itself is normal, the FET switch does not work, and as a result, the secondary protection takes place by means of fuse blowing.

Figure 7:
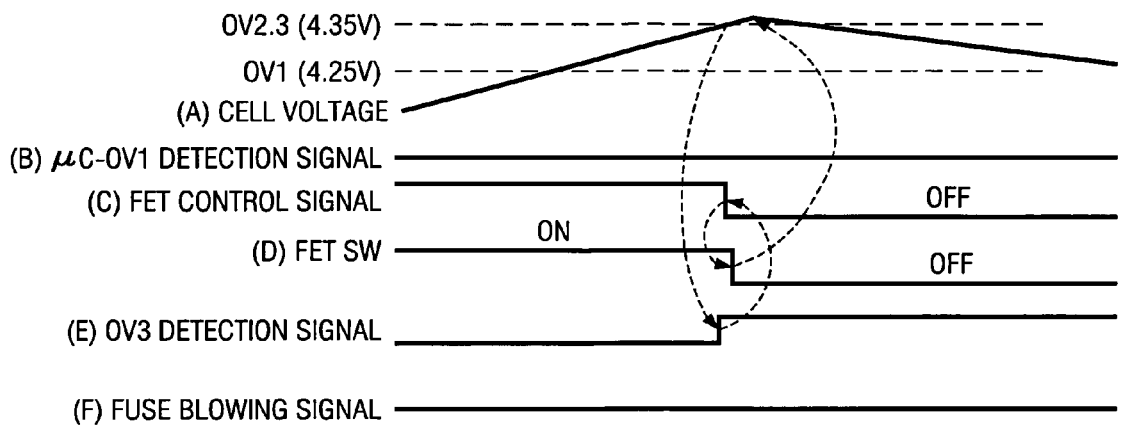
FIG. 7 is a timing chart illustrating the voltages and signals in the OV3 protection operation.

As shown in FIG. 7(A), when over-voltage detector 38 detects that the cell voltage reaches OV3 level (e.g., 4.35 V), OV3 signal (FIG. 7(E)) is output from over-voltage detector 38. As OV3 signal is input to level shift circuit (LVL SFT) 39, as shown in FIG. 7(C), the FET control signal output from level shift circuit 39 changes from the high level to the low level, and corresponding to this change, FET switches SW1 and SW2 are turned off. In this case, the off switch may be either switches SW1 and SW2 shown in FIG. 3, depending on the constitution of the FET switch circuit. As a result, the high-side path is cut, and the cell voltage gradually falls. If the cell voltage still does not fall after a preset time (1.5 sec), like the case of OV2 protection mode, the fuse is blown.

In the constitution shown in FIG. 1, if over-voltage signal OV1 is not output due to a malfunction on the side of microcomputer (μC) 2, because the primary protection does not work due to said over-voltage signal OV1, the secondary protection function blows fuse F1, rendering battery system 1A unusable. In order to prevent this problem, one may assemble an OV/UV detector that determines whether the cell on the side of primary protection circuit (IC1) 3A has an over-voltage (OV) or a normal voltage below the over-voltage (UV: Under Voltage) with reference to a threshold. However, it is difficult to adjust the relative magnitudes and margin of the threshold set on the primary protection circuit side and the threshold set on the secondary protection side. Consequently, it is difficult to adopt this method in the constitution shown in FIG. 1, where the primary protection and secondary protection are performed with individual ICs.

The constitution shown in FIG. 3 can perform said threshold adjustment more easily by integrating the primary protection and the secondary protection. With this constitution, it is possible to set the timing such that FET switches SW1, SW2 for primary protection are turned off immediately before the operation of the secondary protection and the outputting of the fuse blow signal. Also, because it is possible to set the protecting timing as the design value, there is no need for excessive margin, and it is also possible to integrate the primary protection and the secondary protection smoothly. Thus, since microcomputer (μC) 2 receives an alarm signal from protection circuit (IC) 3B, it goes to an appropriate malfunction processing routine, such as an initialization routine, so that the microcomputer itself is reset to eliminate the malfunction. As a result, it is possible to reset the normal state with this constitution.

Figure 8:
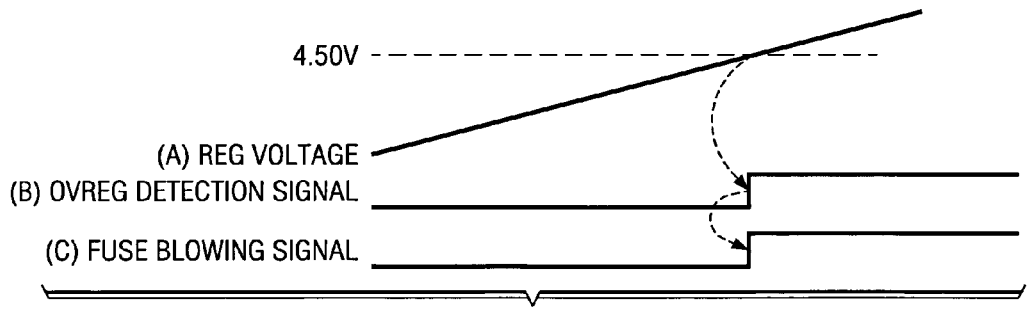
FIG. 8 is a timing chart illustrating the voltages and signals in the OVREG protection operation.

FIGS. 8(A)–8(C) are timing charts of the voltages and signals in the case of OVREG protection operation.

"OVREG protection mode" is a secondary protection mode newly set for increasing the fail-safe function on the side of microcomputer (μC) (2). For this purpose, it has a constitution that has a new part, that is, over-voltage detector (comparator) 41 that monitors whether the output from regulator (REG) 35 is an over-voltage. In order to execute secondary protection before the internal logic is damaged and abnormal operation occurs as the power supplied to microcomputer 2 reaches an abnormal voltage, over-voltage detector 41 monitors the output voltage (REG voltage) of regulator 35. As shown in FIG. 8(A), when said REG voltage exceeds the reference voltage, e.g., 4.5 V, as shown in FIG. 8(B), the level changes in the OVREG detection signal from over-voltage detector 41, and it is output to fuse blow output circuit 39. Consequently, as shown in FIG. 8(C), the fuse blow signal from fuse blow output circuit 39 changes from low level to high level. As a result, NMOS transistor NM1 turns on, and fuse F1 is blown so that the path on the battery side is cut. Also, by application of this protection mode, it is possible to prevent data damage in microcomputer 2, and analysis of the defect becomes easier, which is desirable.

FIGS. 9(A)–9(F) are timing charts of the voltages and signals in the WDF2 protection operation.

"WDF (Watchdog Fault) 2 protection mode" increases the function of the "WDF protection mode" (primary protection mode) in the constitution shown in FIG. 1. In the constitution shown in FIG. 1, when clock CLK is stopped, since watchdog circuit 36 that monitors the output of clock signal CLK from microcomputer 2 detects the clock stop state, the WDF detection signal is output to FET drive circuit 31, and as a result, FET switches SW1 and/or SW2 are turned off.

In the constitution shown in FIG. 3, switch (WDF SW) 43 is set in the signal output path from watchdog circuit 36, and it enable fuse cutting operation in addition to the FET off operation. This switch information can be set as desired and kept in a register (such as the status register in interface logic circuit 37) in protection circuit (IC) 3B.

Because switch 43 is switched on the basis of this register information, when the protection functions, the FET off operation or the fuse blowing operation is executed.

Figure 9:
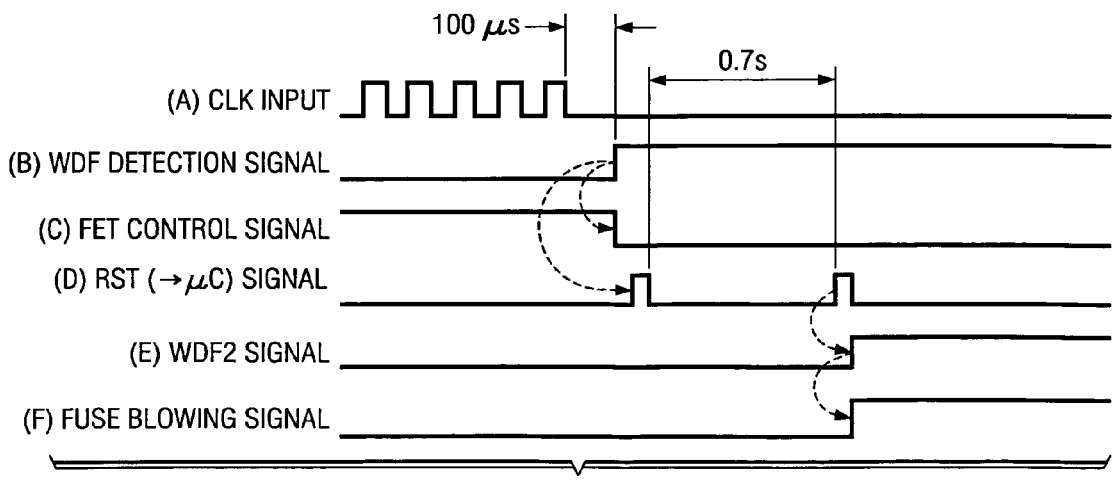
FIG. 9 is a timing chart illustrating the voltages and signals in the WDF2 protection operation.

FIG. 9 is a timing diagram illustrating the processing sequence.

For example, if the contents of the status register are set to select the FET off operation. When watchdog circuit 36 detects clock stop (FIG. 9(B)), for example, the reset signal (RST) shown in FIG. 9(D) is sent from interface logic circuit 37 or regulator 35 to microcomputer 2. On the basis of this signal, microcomputer 2 performs the reset operation. In this case, a control signal for turning off FET switches SW1 and SW2 is output. As shown in FIG. 9(E), if there is no input of clock signal CLK to watchdog circuit 36 within a prescribed time, then once again, after, e.g., 0.7 sec, reset signal RST is sent to execute the reset operation. When no clock output is obtained after the two reset cycles, said reset operation is repeated.

On the other hand, if the contents of the status register are set to select the fuse blowing operation, after detection of clock stop with watchdog circuit 36, once again a reset signal is sent to microcomputer 2, and at the same time, a control signal is sent for setting FET switches SW1 and SW2 to the off state. If there is then no clock signal CLK input, the fuse is blown by outputting a cutting signal after 0.7 sec (FIG. 9(F)). If there is a clock signal input after the reset signal is sent, it is reset to the normal state, so that the fuse cut is not blown.

For battery system 1B shown in FIG. 3, efforts are made to increase the protection of FET switches SW1, SW2, FET drive circuit 31, and regulator 35.

Usually, when an FET switch is connected in the high-side path of the battery, a PMOS FET is usually used for the switch. Also, a clamping circuit is often used in the drive circuit of the PMOS FET. However, if problems develop with the drive circuit, the PMOS FET may quite possibly remain in the normally on state. Consequently, in this case, the fail-safe state is not realized. Also, because the PMOS FET has a relatively high on-resistance since a PMOS FET is used, it is necessary to keep the on-resistance to a lower level to meet the performance demands of up-to-date hardware. In this case, measures that lead to an increase in the parts count and assembly size are adopted. For example, plural switches may be connected in parallel.

In the constitution shown in FIGS. 1 and 3 as an embodiment of the present invention, in order to increase the fail-safe function, high-side NMOS FETs are adopted as two FET switches SW1, SW2 set in the path of the positive electrode side of the battery cells. Also, a charge pump containing capacitors is adopted in FET drive circuit 31.

Figure 10:
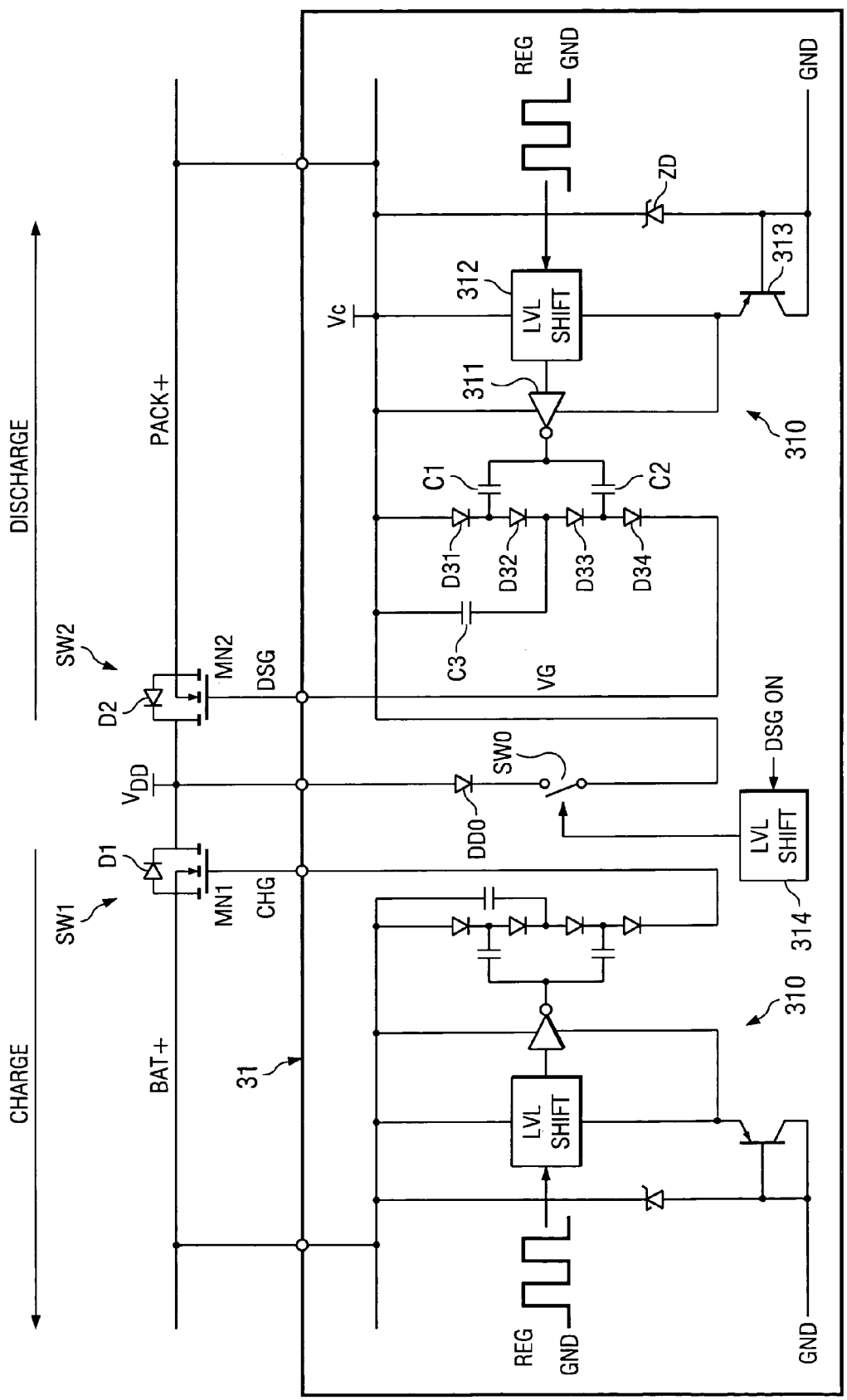
FIG. 10 is a circuit diagram illustrating the FET drive circuit that drives the FET switch.

FIG. 10 is a circuit diagram illustrating FET switches SW1, SW2 and FET drive circuit 31.

As shown in FIG. 10, the two FET switches SW1 and SW2 connected in series in the high-side path are composed of NMOS transistors and diodes. The diodes are the parasitic diodes of the MOS transistors. Diode D1 of FET switch SW1 is connected in the direction of back gate to drain of transistor MN1, and diode D2 of FET transistor SW2 is connected in the direction of back gate to drain of transistor MN2. Also, the sources and back gates of NMOS transistors MN1, MN2 are electrically connected. Consequently, said two diodes D1 and D2 are connected in opposite directions. Thus, switch SW1, executes control in only the direction of the charging (CHG) current from "PACK+" to "BAT+". On the other hand, switch SW2 executes control only the direction of the discharge (DSG) current from "BAT+" to "PACK+".

Also, if said FET switches SW1, SW2 are composed of PMOS transistors, the logic used to drive FET drive circuit 31 will be opposite that to drive NMOS transistors.

FET drive circuit 31 has charge pump circuit 310, which contains capacitors, that is set on the DSG side and CHG side in a corresponding way.

Charge pump circuit 310 boosts the voltage of "PACK+" or "BAT+" by means of the pumping pulse (about 3.3 V) supplied from an oscillator to generate a prescribed positive gate voltage. A booster part is formed from four diodes D31~D34 and three capacitors C1~C3 so that a sign is imparted to the DSG side. The input side includes inverter 311, level shift circuit 312 for amplification of pumping pulses, Zener diode ZD for clamping, and PNP transistor 313.

When the PC side is loaded or in protection mode, since FET switches SW1, SW2 are off, "PACK+" terminal may be 0 V. In this case, the input voltage of the FET drive circuit of NCh switch SW2 on the DSG side will be zero, and startup cannot occur. In this case, in order to initiate startup, voltage VDD can be fed through diode DD0 and switch SW0 to the input voltage line. For switch SW0, timing control is performed as the DSG on signal is adjusted with level shift circuit 314 before it is given.

Figure 11:
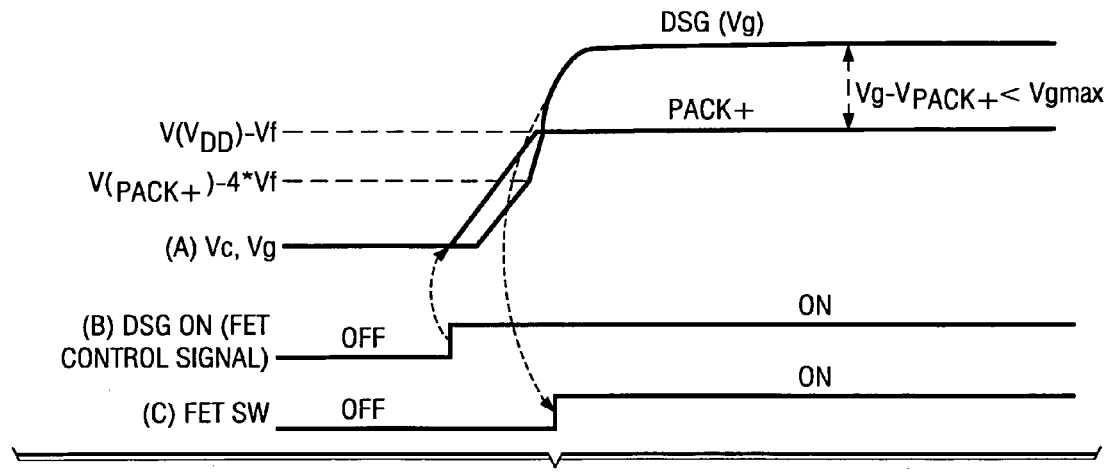
FIG. 11 is a timing chart illustrating the sequence for setting the gate bias of the FET switch.

FIGS. 11(A)~11(C) illustrate the sequence of the gate bias setting operation. Here, in order to explain the operation on the DSG side, the voltage of "PACK+" is represented as V(PACK+), the input voltage to the charge pump circuit is represented as Vc, the gate voltage of output is represented as Vg, and the forward voltage of diodes D31~D34 for boosting switching is represented as Vf.

When "PACK+" is 0 V and DSG on signal (FET control signal) is input (FIG. 11(C)), switch SW0 is turned on, and VDD voltage is applied to input voltage Vc of the charge pump circuit through diode DD0, so that its voltage Vc rises. As shown in FIG. 11(A), when voltage Vc reaches a certain level (V(PACK+)−4·Vf), by means of the charge pumping function, gate voltage Vg of DSG-side transistor MN2 is raised, and, as it exceeds the threshold of transistor MN2, it goes to the actual on state shown in FIG. 11(C). In this case, it is assumed that while CHG-side FET switch SW1 is off, there is no load between "PACK+" and "PACK−". When CHG-side transistor MN1 and DSG-side transistor MN2 are on at the same time, since CHG-side transistor MN1 is on, voltage VDD is raised to the same level as "BAT+", and since DSG-side transistor MN2 is on, the potential of "PACK+" finally reaches the same level as the potential of "BAT+".

In this constitution, as explained above, by adopting NMOS transistors MN1, MN2, the fail-safe function is increased. Also, a charge pump circuit for driving is used. However, this scheme leads to an increase in the parts count, can increase the footprint (area occupied by the assembled components), and a degradation of reliability due to ESD (Electrico-Static Discharge), etc. This is like putting the cart before the horse. Consequently, in the circuit shown in FIG. 10, which contains capacitors, charge pump circuit 310 is used. As a result, the footprint is minimized, and it is also possible to prevent degradation of reliability due to ESD, etc. Input voltage Vc of charge pump circuit 310 is selected with reference to the source potential of NMOS transistors MN1, MN2 such that as shown in FIG. 11(A), the potential difference (Vg-VPACK+) boost due to charge pumping is less than the maximum gate-source voltage Vgs of the FET transistor.

The increased protection function of regulator 35 will be explained below. In regulator 35 shown in FIGS. 1 and 3, a function for preventing the back flow of the regulator during operation of the over-current protection function is added.

Figure 12:
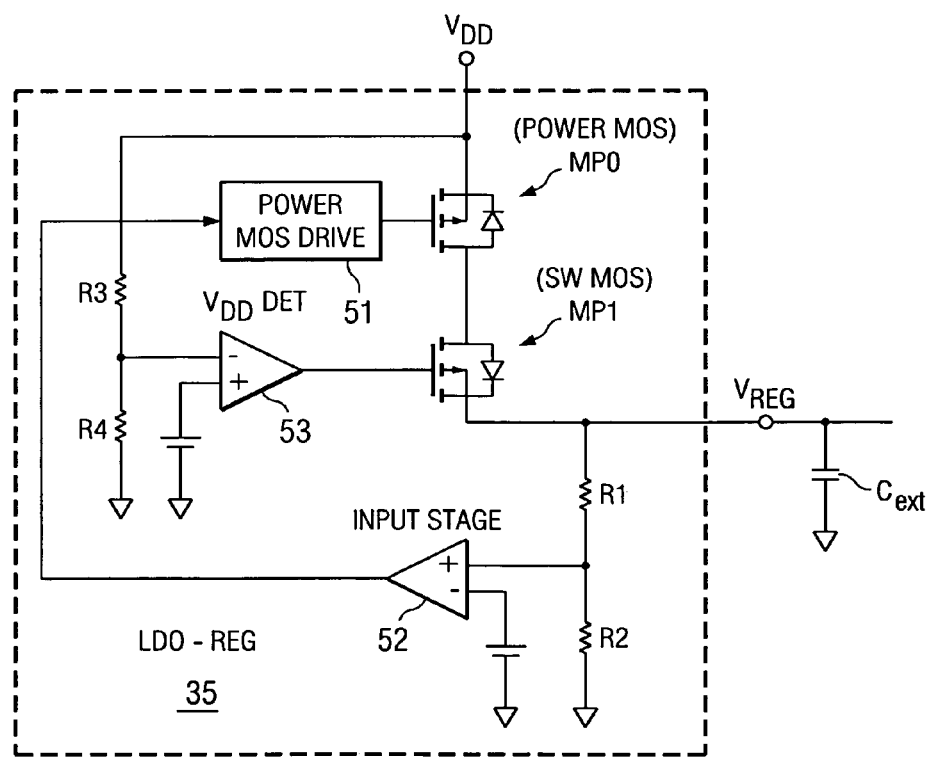
FIG. 12 is a circuit diagram illustrating the regulator.

FIG. 12 is a diagram illustrating the constitution of the regulator.

Regulator 35 contains transistor MP0 made up power PMOS FET and for output driving switch, power MOS driver 51, and input-stage comparator 52. Comparator 52 compares output voltage VREG with a reference voltage detected by voltage-divider resistors R1 and R2 and sends the result to power MOS driver 51. On the basis of the feedback signal, power MOS driver 51 controls power MOS transistor MP0 to execute control such that linear output voltage VREG is output.

Usually, with a LDO (Low-dropout) regulator, if the input voltage is lower than the output voltage, a reverse current flows and the output of the regulator falls. In the case of the battery protection circuit, said condition that "the input voltage is lower than the output voltage" frequently occurs in the protection function for preventing over-currents. For example, when a short-circuit occurs in load 102 on the side of PC 100 (see FIG. 3), or when a short-circuit occurs at the "BAT+" terminal, because the potential on one side falls to GND level, voltage VDD, which is also the input voltage to regulator 35, falls below regulator output voltage VREG.

In order to prevent said reverse current, regulator 35 shown in FIG. 12 has a constitution in which PMOS transistor MP1 for switching is added to the output stage, and is driven by comparator 53, as well as voltage-divider resistors R3 and R4 for detecting voltage VDD.

After voltage VDD as the input voltage is divided by resistors R3 and R4 and is converted to an appropriate level, it is compared with a prescribed reference voltage input to inverted input "−" of comparator 53, and corresponding to the magnitude relationship, comparator 53 turns switching PMOS transistor MP1 on/off. Consequently, when input voltage VDD starts to go lower than output voltage VREG, PMOS transistor MP1 is turned off at the output voltage VREG level, and reverse current flow is prevented. Consequently, with the constitution of regulator 35 shown in FIG. 12, an ideal LDO for the protection circuit can be realized.

Here, the constitution monitors input voltage VDD. However, the same function can be realized by means of a constitution that monitors the internal voltage generated from input voltage VDD.

FIGS. 13(A)~13(F) are timing charts illustrating the voltages and signals when an over-load (OL) takes place due to a short-circuit in the load on the PC side.

Figure 13:
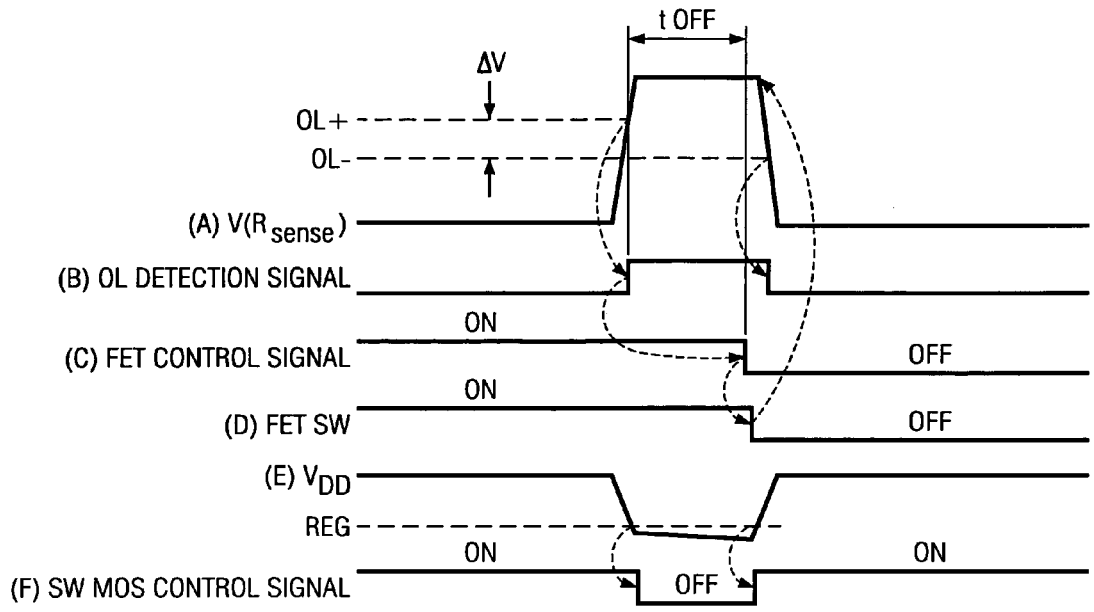
FIG. 13 is a timing chart illustrating the voltages and signal in the case when an overload takes place due to a short-circuit in the load on the PC side.

First, as shown in FIG. 13(A), potential difference V(Rsense) across the ends of resistor Rsense, the over-current detected value, rises from the prescribed threshold "OL+". When this is detected by over-current detector 32 of protection circuit (IC1) 3, after a prescribed time "t_off", OL detection signal that turns off FET switches SW1, SW2 is output (FIG. 13(B)). FET control signal that goes to low level after a prescribed period of time is output from FET drive circuit 31, to which the OL detection signal is input (FIG. 13(C)). Upon receiving it, FET switches SW1, SW2 turn off immediately (FIG. 13(D)). When FET switches SW1, SW2 are off and the current path is interrupted, potential difference V (Rsense) across the ends of sense resistor Rsense start falling (FIG. 13(A)). In order to prevent a malfunction, the over-load (OL) threshold is set to have a certain amount of hysteresis ΔV. When it drops below threshold "OL−," the over-load detection comes to an end, and the OL detection signal returns to the low level (FIG. 13(B)).

Here, a decrease in the voltage VDD refers to the time when an over-load (OL) is detected and until the FET switch turns off, as shown in FIG. 13(E). In this case, when it is detected that the voltage VDD is less than output level VREG of the regulator by means of voltage-divider resistors R3, R4 and comparator 53, by means of the control signal from comparator 53 (FIG. 13(F)), PMOS transistor MP1 for switching is turned off. As a result, a decrease in the output voltage VREG of the regulator can be suppressed.

Figure 14:
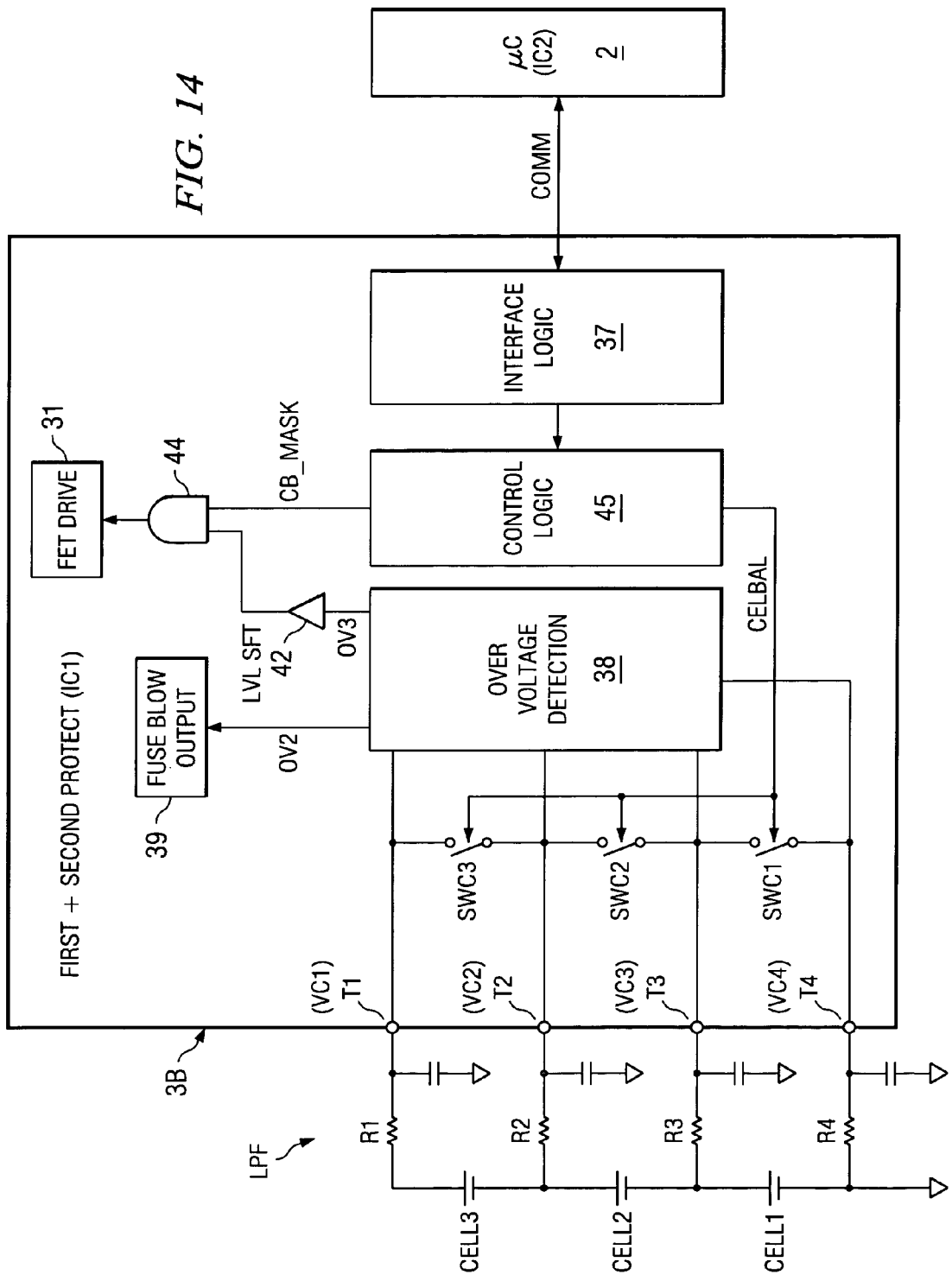
FIG. 14 is a circuit diagram illustrating a detail of the secondary protection function of FIG. 3.

The suppression of malfunctions in the secondary protection function by means of the cell balance function will be explained below. FIG. 14 is a diagram illustrating in detail the secondary protection function portion of the protection circuit shown in FIG. 3.

The constitution of protection circuit (IC) 3B shown in FIG. 14 contains FET drive circuit 31, interface logic circuit 37, over-voltage detector 38, fuse blow output circuit 39, and level shift circuit 42, as was explained with reference to FIG. 3. Although not shown in FIG. 3, protection circuit 3B also has AND-gate 44, which has the input on one side connected to the output of level shift circuit 42 and the output connected to FET drive circuit 31, and control logic circuit 45 is connected to the input on the other side of AND-gate 44.

Also, protection circuit 3B has detection terminals for the 4 cell voltages connected to over-voltage detector 38 (detection voltages: VC1, VC2, VC3, VC4), and it has three internal switches SWC1, SWC2, SWC3 connected between adjacent detection terminals. Said detection terminals are electrically connected to the respective battery cell electrodes. Said internal switches SWC1, SWC2, SWC3 turn on so that the control input of control logic circuit 45 is received and current is discharged from the cell with the higher voltage when voltage values Vcell of the battery cells from among the individual cells become unbalanced (for example, when Vcell1=4.0 V, Vcell2=4.1 V, Vcell3=4.2, etc.).

Usually, low-pass filters (LPF) are connected to remove noise between the individual battery cells and protection circuit IC 3B, as shown in the figure. Consequently, a resistance network is formed with resistance components Rlpf (R1~R4) of the LPFs and the on-resistances Ron of switches SWC1~SWC3, and the apparent cell voltage may vary as seen from the IC. As a result, it is possible to detect an erroneous over-voltage value, and execute the secondary protection function of blowing the fuse.

For example, as shown in FIG. 14, Vcell1=Vcell2=Vcell3=4.0 V, R2=R3=R4=1 kΩ, and the on-resistances Ron of switches SWC1, SWC2, SWC3 are 500 Ω, only switch SWC2 will turn on. In this case, the apparent cell voltages become Vcell1=12 V, Vcell2=6.4 V, Vcell3=5.6 V, and Vcell4=0 V, and the operation of overvoltage detector 38 will be based on the detection of said cell voltages. First, signal OV3 which turns off FET switches SW1 and SW2 is output, and if the primary protection is insufficient, signal OV2 that blows fuse F1 is output.

This is an example of a system malfunction. In order to prevent such malfunctions, in the constitution shown in FIG. 14, the on state of the cell balance is detected and measures are taken to mask the signal OV3 (to prevent malfunction in OV3 protection mode), and measures are taken to reset the cell balance each time (to prevent malfunction in the OV2 protection mode).

However, since the purpose of the primary protection is provide ultimate safety, this safety may be comprised as the secondary protection function is changed due to the primary protection operation from the standpoint of mutual independence. Consequently, no change is made to the constitution of the secondary protection circuit, and only the constitution of the primary protection circuit and the control signal from microcomputer 2 are used to prevent said malfunction.

Figure 15:
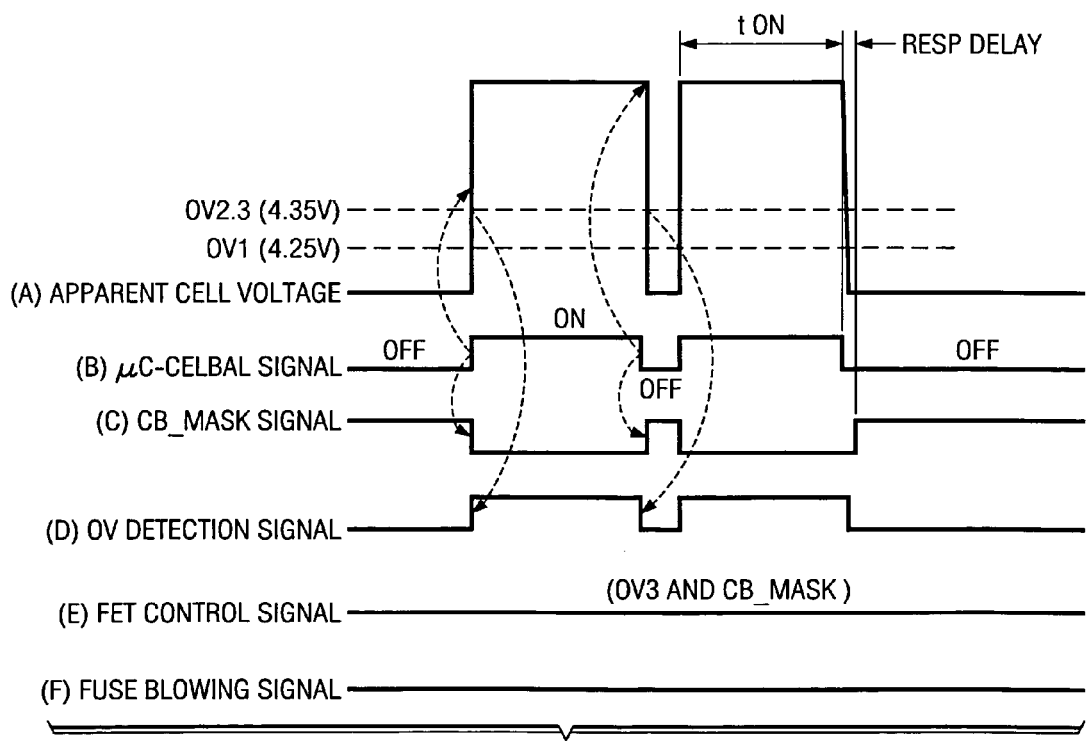
FIG. 15 is a timing chart illustrating the operating sequence in the cell balance control.

FIG. 15 is a diagram illustrating the operating sequence of the cell balance control operation.

First, malfunction suppression of the OV3 protection mode will be explained. In this case, cell balance instruction signal ("μC-CELBAL"), a command signal (Comm.), is sent from microcomputer 2 (IC2) (FIG. 15(B)). And the control value becomes "H" with the register of control logic circuit 45 in protection circuit IC1 3B. On the basis of this control value, cell balance signal ("CELBAL") is output from control logic circuit 45, and by means of this signal, at least one of switches SWC1~SWC3 is turned on. Then, overvoltage detector 38 operates, and OV3 signal for turning off FET switches SW1 and SW2 is sent to FET drive circuit 31. At the same time, "CB_MASK" signal (FIG. 15(C)) for suppressing FET off in the case of cell balance is sent from control logic circuit 45 to AND-gate 44, and an actual FET control signal is generated: the AND (logical product) of OV3 signal from over-voltage detector 38 for secondary protection and "CB_MASK" signal. Consequently, the output of AND-gate 44 remains at the low level without change. As a result, the FET is not turned off due to a malfunction during the period of cell balance. Also, as shown in FIG. 15(C), in consideration of the time from when the "μC-CELBAL" signal is actually turned off to the turning off of the internal switch, a certain delay time is set for "CB_MASK" signal (Resp. Delay).

Malfunction suppression of the OV2 protection mode will be explained below.

OV2 protection is a basic function of the secondary protection circuit (over-voltage detector 38). When a malfunction takes place, fuse F1 is blown, and the current path from the battery is cut. In order to suppress this malfunction, the on time of the "μC-CELBAL" signal from the side of microcomputer 2 is controlled. In this case, the time of "t_on" shown in FIG. 15(B) is set to be shorter than the set time of the secondary protection circuit. For example, in said battery system, the set time from the sending of signal OV2 to fuse blowing is at least one sec. In this respect, on the side of microcomputer 2, "t_on" is set to be within 1 sec, and the cell balance is turned off once, so that malfunction of OV2 protection mode is suppressed.

The battery system shown in FIG. 3 has the following advantages.

First, because the primary protection circuit and the secondary protection circuit are integrated, compared with the case shown in FIG. 1 in which integrated circuits IC3 and IC4 are required for primary protection and secondary protection, respectively, the size of the assembly is smaller, which can meet the demands for smaller assemblies of recent years. Also, although, the primary and secondary protection circuits are joined, they still operate independently as separate power sources, so that degradation of safety due to their joining can be suppressed.

Second, by adding the "OV3 protection mode", it is possible to realize more reliable protection to prevent malfunctions. Because once the secondary protection function operates, the battery system cannot be reset to its original state, and there is the demand that while more reliable protection can be effected, it should be realized by the primary protection function as long as possible. The added "OV3 protection mode" can integrate the primary and secondary protection functions, so that the operation is performed by the primary protection side as long as possible. As a result, the aforementioned demand is satisfied.

Also, there is the advantage that the primary protection using the "OV3 protection mode" has a good responsivity. Usually, primary protection is realized when an abnormality is detected by the value read from the A/D converter of microcomputer 2, and corresponding to the detected value, a command is sent. Consequently, it is difficult to respond instantaneously (within 1 ms) to the abnormality. In this embodiment, this feature is improved. That is, even in case of a malfunction of the secondary protection due to a noise spike or for some other reason, the primary protection operates with high responsivity, independently of the instruction of the microcomputer, and only when this fails, is the operating sequence of the secondary protection function initiated. As a result, compared with the case shown in FIG. 1, in which there are no effective measures other than the function to prevent malfunctions by means of the time and threshold set for the secondary protection circuit itself or hysteresis, this system has a greater ability to prevent malfunctions of the secondary protection.

Fourth, as a common effect shared by FIGS. 1 and 3, it is possible to improve the reliability of the protection by adopting the high-side NMOS switch that is off in the unbiased state, and it is also possible to reduce the on-resistance of the switch. Also, by adopting the charge pump circuit with capacitors, it is possible to assemble the FET bias circuit appropriate for NMOS switch without increasing the assembly area and the number of externally connected components. In addition, it has a constitution that allows startup of the FET switch even when the input is low. Consequently, practical applicability is improved.

Fifth, it is possible effectively to suppress the risk that the input voltage (VDD) of the regulator will drop below the output voltage (VREG), and to prevent a decrease in the output of the regulator.

Sixth, it can effectively suppress malfunctions in the primary and secondary protection functions in the case of cell balance.

The present invention is not limited to the aforementioned embodiment. The following modifications can be made. First, in the aforementioned embodiment, the externally attached NCh FET switch has a common drain connection. However, it is also possible to use a common source connection. OR of the signals or cell balance suppression may be performed by means of the control logic instead the FET drive circuit. In order to further improve reliability, it is also possible to assemble the OV/LV detector independently on the primary protection side. Also, the number of battery cells is not limited to three. One may also use two or four or more cells. Also, by carrying the protection circuits in two stages, it is also possible to handle the case of 8 cells. Also, by placing an SMBUS interface and the ADC in the primary protection circuit, it is also possible to integrate the microcomputer IC2. Also, one may make use of externally attached capacitors for the charge pump circuit. In this case, although the number of the externally attached components increases, the on time for the FET can be reduced, which is advantageous. In the aforementioned embodiment, the OV1 level and OV2 level are 4.25 V and 4.35 V, respectively. However, it is also possible to use other voltages appropriately corresponding to the specific application.

What is claimed is:

1. A battery protection circuit used to control the operation of a first switch circuit and a second switch circuit inserted in series in a power supply path between battery cells and an external power source, comprising a first protecting controller, having an interface circuit for receiving a command signal output from a controller monitoring whether the voltage of the battery cells is higher than a first voltage, and generating a control signal for controlling operation of the first switch circuit, a second protecting controller, having an over-voltage detector that detects whether the voltage of the battery cells is higher than a second voltage or higher than the first voltage, and generating a control signal for controlling the operation of the first switch circuit and a second control signal for controlling the turning off of the second switch circuit;

wherein, when the over-voltage detector of the second protecting controller detects that the voltage of the battery cells is higher than said second voltage, a control signal for turning off the first switch circuit is generated; then, when the voltage of the battery cells remains higher than the second voltage after a prescribed time, the second control signal is generated for turning off the second switch circuit.

2. The battery protection circuit described in claim 1 wherein the first protecting controller and the second protecting controller are formed a single semiconductor chip.

3. The battery protection circuit described in claim 2 further comprising a first power source circuit that generates power source voltage for said first protecting controller from the voltage supplied from the battery cells or the voltage supplied from the external power source, and a second power source circuit that generates power source voltage for said second protecting controller from the voltage supplied from the battery cells.

4. The battery protection circuit described in claim 3 further comprising a comparator that compares the output voltage of the first power source circuit and a reference voltage, and when the comparator detects that the output voltage of said first power source circuit is higher than said reference voltage, generates a control signal for turning off the second switch circuit.

5. The battery protection circuit described in claim 2 further comprising a clock monitoring circuit that monitors a clock signal supplied from the controller, and a register for holding a first or second mode state;

wherein, when the clock signal is not supplied throughout a first period, a reset signal is supplied to the controller, and at the same time, a control signal for turning off the first switch circuit is generated; then, if the clock signal is not supplied throughout a second period, in the first mode, a reset signal is supplied, and in the second mode, a control signal for turning off the second switch circuit is output.

6. The battery protection circuit described in claim 1 further comprising a cell balance circuit that balances the battery cell voltage by a short circuit control between electrodes of the battery cells, and a control signal gate circuit that prohibits output of the control signal to the first switch circuit during the period when said cell balance circuit performs cell balance.

7. The battery protection circuit described in claim 1 wherein the first switch circuit comprises of MOS transistors, and the second switch circuit comprises fuses.

8. The battery protection circuit described in claim 7 wherein the first switch circuit comprises of NMOS transistors.

9. The battery protection circuit described in claim 3 further comprising a clock monitoring circuit that monitors a clock signal supplied from the controller, and a register for holding a first or second mode state;

wherein, when the clock signal is not supplied throughout a first period, a reset signal is supplied to the controller, and at the same time, a control signal for turning off the first switch circuit is generated; then, if the clock signal is not supplied throughout a second period, in the first mode, a reset signal is supplied, and in the second mode, a control signal for turning off the second switch circuit is output.

10. The battery protection circuit described in claim 4 further comprising a clock monitoring circuit that monitors a clock signal supplied from the controller, and a register for holding a first or second mode state;

wherein, when the clock signal is not supplied throughout a first period, a reset signal is supplied to the controller, and at the same time, a control signal for turning off the first switch circuit is generated; then, if the clock signal is not supplied throughout a second period, in the first mode, a reset signal is supplied, and in the second mode, a control signal for turning off the second switch circuit is output.

11. The battery protection circuit described in claim 2 further comprising a cell balance circuit that balances the battery cell voltage by a short circuit control between electrodes of the battery cells, and a control signal gate circuit that prohibits output of the control signal to the first switch circuit during the period when said cell balance circuit performs cell balance.

12. The battery protection circuit described in claim 3 further comprising a cell balance circuit that balances the battery cell voltage by a short circuit control between electrodes of the battery cells, and a control signal gate circuit that prohibits output of the control signal to the first switch circuit during the period when said cell balance circuit performs cell balance.

13. The battery protection circuit described in claim 4 further comprising a cell balance circuit that balances the battery cell voltage by a short circuit control between electrodes of the battery cells, and a control signal gate circuit that prohibits output of the control signal to the first switch circuit during the period when said cell balance circuit performs cell balance.

14. The battery protection circuit described in claim 5 further comprising a cell balance circuit that balances the battery cell voltage by a short circuit control between electrodes of the battery cells, and a control signal gate circuit that prohibits output of the control signal to the first switch circuit during the period when said cell balance circuit performs cell balance.

15. The battery protection circuit described in claim 2 wherein the first switch circuit comprises of MOS transistors, and the second switch circuit comprises fuses.

16. The battery protection circuit described in claim 3 wherein the first switch circuit comprises of MOS transistors, and the second switch circuit comprises fuses.

17. The battery protection circuit described in claim 4 wherein the first switch circuit comprises of MOS transistors, and the second switch circuit comprises fuses.

18. The battery protection circuit described in claim 5 wherein the first switch circuit comprises of MOS transistors, and the second switch circuit comprises fuses.

19. The battery protection circuit described in claim 6 wherein the first switch circuit comprises of MOS transistors, and the second switch circuit comprises fuses.

* * * * *